United States Patent [19]

Nakamura

[11] 3,816,770

[45] June 11, 1974

[54] DATA INPUT DEVICE

[75] Inventor: Tadahiko Nakamura, Kanagawa-ken, Japan

[73] Assignee: Sony Corporation, Tokyo, Japan

[22] Filed: Aug. 24, 1972

[21] Appl. No.: 283,302

[30] Foreign Application Priority Data

Aug. 30, 1971 Japan ................................ 46-66409

[52] U.S. Cl. .......... 307/308, 307/235 R, 307/247 A, 340/365 E

[51] Int. Cl. .......................... H03k 7/00, H3k 17/06

[58] Field of Search ............ 307/247 A, 308, 235 R; 178/17 A, 17 C, 17 D; 340/365 E

[56] References Cited

UNITED STATES PATENTS

| | | | |
|---|---|---|---|
| 3,474,264 | 10/1969 | Hughes | 307/290 |
| 3,504,196 | 3/1970 | Thompson | 307/308 X |

*Primary Examiner*—John Zazworsky

*Attorney, Agent, or Firm*—Lewis H. Eslinger, Esq.; Alvin Sinderbrand, Esq.

[57] ABSTRACT

A circuit to obtain hysteresis effect in a switch by providing variable impedance controlled by movement of the switch actuator and incorporated in a coupling circuit between a voltage source and a switching circuit. When the voltage coupled from the source to the switching circuit is above a certain level, the coupling circuit has one transfer characteristic controlled by the switching circuit; when the voltage is below that level, the coupling circuit has a different transfer characteristic. The change in transfer characteristic as the coupled voltage passes through that level is such as to enhance the effect of coupled voltage change by a pre-determined amount so that additional reverse movement of the actuator will be required to reverse the status of the switching circuit.

11 Claims, 14 Drawing Figures

PATENTED JUN 11 1974

3,816,770

DATA INPUT DEVICE

BACKGROUND OF THE INVENTION

1. Field of the Invention

This invention relates to the field of momentary-contact switches and particularly to circuit means for effectively creating a hysteresis type of action for such switches.

2. Prior Art

Momentary-contact switches have contacts that move together or apart in direct response to movement of an actuator. A doorbell switch is a common example. The button is directly connected to the contacts to force them into engagement if enough force is applied or to allow them to separate if the force is reduced. At a certain level of force, the increment required to bring the contacts into engagement is very small, and the amount of movement is also small. It is the nature of such switches that, at this critical force level, the decrease in force required to separate the contacts is correspondingly small. If a force substantially equal to this critical level is applied to the actuator, it is possible to produce intermittent, multiple operation of the switch when only a single operation is desired. In the case of a doorbell, it does not matter greatly whether the switch contacts are brought together only once, as intended, or several times in quick succession, as could happen if the critical force level were applied.

There are electrical switches that have, in effect, a hysteresis type of action. one such switch is the ordinary toggle switch. The actuator of a toggle switch may be brought to the point where only a slight increment of force will cause the contacts to move into engagement. However, the actual movement of the contacts is not produced directly by the actuator but by a further mechanical structure which is so arranged that, once the actuator is moved beyond the critical point, the contacts will be switched into engagement and cannot be separated unless the actuator is moved in the reverse direction by a substantial distance. Conversely, when the actuator of a toggle switch is moved sufficiently in the reverse direction to separate the switch contacts and cause them to snap back to their original location, the toggle mechanism again makes it necessary to move the actuator relatively far in order to reengage the contacts. A toggle switch actuator cannot be brought to a specific location and then moved incrementally back and forth about this position to cause the switch contacts to open and close, and such a switch may be said to have hysteresis action.

There are devices that cannot easily make use of a toggle switch and are better adapted to a momentary-contact switch but yet require some assurance that repeated openings and closings of the contacts will not be obtained if the actuator is brought to a specific location within its range of movement and then moved slightly back and forth about this position. These instruments require switches of the momentary-contact type that have hysteresis of operation. The push button telephone is such an instrument. So is an electric typewriter or an electric adding machine.

It is one of the objects of the present invention to provide a data input device in the form of a switch and circuit related to each other such that there is effective hysteresis of operation.

A more specific object of the invention is to provide a direct-acting push button switch with a related circuit arranged so that the last increment of force and movement required to actuate the switching operation when the button is depressed is much less than the reverse force and movement required to return the switch and circuit to their original state.

BRIEF DESCRIPTION OF THE INVENTION

In accordance with the present invention a switch is provided with a variable impedance structure controlled by the switch actuator. This variable impedance is connected as part of a coupling circuit between a voltage source and a switching circuit, and the output of the switching circuit is connected back to the coupling circuit to control the transfer characteristic of the coupling circuit. The switching circuit is actuated when a certain fraction of the voltage from the source is transferred to the switching circuit by means of the coupling circuit. When this voltage reaches the critical level at which the switching circuit is actuated, the output of the switching circuit changes the transfer characteristic of the coupling circuit in such a way as to increase substantially the amount of voltage coupled to the switching circuit. The movement of the switch actuator may be, and preferably is, very smooth as it moves the last incremental amount necessary to pass into the critical zone where the switch is actuated. However, the resultant increase in voltage transferred to the switching circuit when the switching circuit changes its state of conductivity, for example from non-conductive to conductive, makes it necessary to move the switch actuator a substantial distance in the reverse direction and by substantial change of pressure in order to reduce the voltage coupled to the switching circuit back to the level at which the switching circuit will again reverse its state of conductivity, e.g., back to the non-conductive state. Once the switching circuit does reverse its state of conductivity back to the original state, the effect will be to change the transfer characteristic of the coupling back to the original value and thus suddenly reduce still further the voltage coupled to the switching circuit. This conforms to the required hysteresis effect and is obtained in conjunction with the smoothness of operation of a direct-acting switch. It is particularly useful in data entry devices in which it is important to avoid undesired multiple operations.

BRIEF DESCRIPTION OF THE DRAWINGS

FIG. 9 is a section of a data handling system utilizing the data input device of FIG. 3.

DETAILED DESCRIPTION OF THE INVENTION

Figures 1, 2, 3, 4:
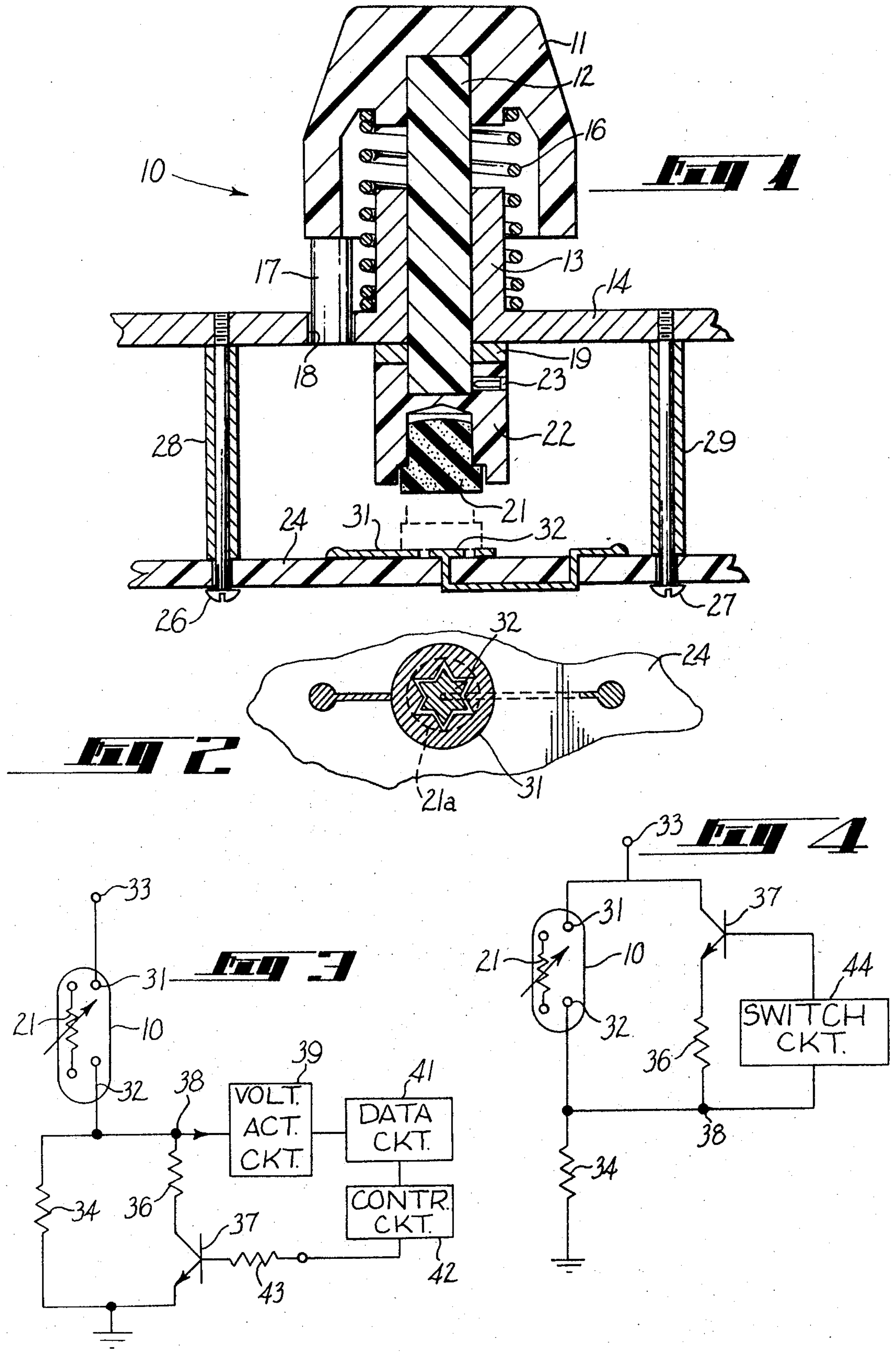
FIG. 1 is a cross-sectional view of a simplified form of the mechanical components of a data input device according to the present invention.
FIG. 2 is a plan view of the contact portion of the device in FIG. 1.
FIG. 3 is a simplified circuit, partly in block diagram form, of a data input device according to the present invention and utilizing the structure of FIG. 1.
FIG. 4 is a modified circuit of a data input device.

The device shown in FIG. 1 is essentially a switch 10 having a push button 11 with a central support post 12 slidably mounted in a collar 13 that forms part of a support plate 14. A spring 16 surrounds the shafts 12 and the collar 13 and is compressed between the underside of the push button 11 and the upper surface of the plate 14 to provide resilient bias urging the push button away from the plate. In order to prevent the push button from rotating within the collar 13, the push button may include a side extension 17 that extends through a separate hole 18 in the plate 14.

Beneath the plate 14 a relatively soft washer 19, such as a felt washer or the like, encircles the shaft 12. A contact member 21, which may be made of conductive rubber or the like, is held within a support member 22 attached to the lower end of the shaft 12 by a set screw 23 or by any other suitable means.

The circuit portion of the device may be formed by printed surface techniques on an insulating board 24 attached to the plate 14 by any suitable means, such as machine screws 26 and 27, and accurately spaced from the plate 14 by spacers 28 and 29 that surround the screws. The contact portions of the circuit are indicated by reference numerals 31 and 32, and as is indicated in broken lines, depressing the push button 11 lowers the contact 21 into engagement with the circuit contacts 31 and 32.

FIG. 2 is a plan view of one form of the circuit contacts 31 and 32. A broken circle 21*a* indicates the area of engagement of the surface of the contact 21 with the contacts 31 and 32. As may be seen, the contact 31 surrounds the contact 32 but the juxtaposed edges of these contacts are serrated to assure good connection between them when they are bridged by the movable resilient contact 21.

FIG. 3 shows the switch structure 10 connected as part of an electrical circuit. The contact 31 is connected to a terminal 33 of a voltage source and the contact 32 is connected to a resistor 34, the other end of which is connected to ground, which is also the other terminal of the voltage source. In parallel with the resistor 34 is a series circuit comprising a second resistor 36 and the emitter-collector circuit of a transistor 37. The output terminal of this portion of the circuit is the common junction between the contact 32, the resistor 34 and the resistor 36 and is indicated by reference numeral 38. This terminal is connected to the input circuit of a voltage actuated circuit 39, the output of which controls the operation of a data circuit 41, which may be part of a computer, a calculator, or any other type of data-actuated circuit. One output of the data circuit 41 is connected to a control circuit 42, and the output circuit of the control circuit is connected by way of a resistor 43 to the base of the transistor 37.

The contact 21 of the switching device 10 is indicated as a variable resistor, which indeed it is. When this contact makes the slightest connection with the circuit contacts 31 and 32, there is a substantial resistance between the circuit contacts, but as the push button 11 in FIG. 1 is depressed more firmly, the resistivity between the contacts 31 and 32 decreases. It will be noted that the contact 21 and the resistor 34 are connected as a voltage divider across the output terminals of the voltage source. Thus, the voltage at the output terminal 38 is a variable fraction of the source voltage, and this fraction changes as the pressure applied to the push button 11 changes.

The voltage actuated circuit 39 has a threshold, or critical, level at a value within the range of voltages available at the terminal 38. Below this level, the voltage actuated circuit may be non-conductive, or less conductive. Above the threshold level the voltage actuated circuit may be conductive, or more conductive. The change in the state of the voltage actuated circuit 39 as the voltage at the terminal 38 reaches this level, operates the data circuit 41 to produce whatever effect is desired therein. In addition, the data circuit 41 applies a voltage to the control circuit 42 that causes the transistor 37 to become non-conductive, or substantially less conductive than it was. This reduction in conductivity of the transistor 37 increases the amount of resistance in parallel with the resistor 34 to a larger value or to a substantially infinite resistance and thus changes the voltage division ratio. This is the same thing as saying that the transfer characteristic of the circuit comprising the resistive contact 21 and the resistors 34 and 36 is suddenly changed by removing the resistor 36. The change is such as to increase the voltage at the terminal 38 and thus drive the voltage actuated circuit 39 more firmly into conductivity and away from the threshold level.

As pressure is removed from the push button 11, the resistance of the contact 21 increases, which causes the voltage at the terminal 38 to decrease. When this voltage decreases back to the threshold level of the voltage actuated circuit 39, the latter circuit suddenly changes the voltage applied to the data circuit 49 which, in turn, changes the voltage applied to the control circuit 42 in such a way as to return the transistor 37 to conductivity. This effectively connects the resistor 36 in parallel with the resistor 34 again and changes the transfer characteristic of the circuit back to its original value. This change causes a sudden reduction in the voltage at the terminal 38 and thus drops the voltage applied to the voltage actuated circuit 39 substantially below the threshold level.

FIG. 4 shows a modified form of circuit in which the voltage actuated circuit 39, the data circuit 41, and the control circuit 42 are indicated in combination as a switching circuit 44.

The operation of the circuit in FIG. 4 differs from that in FIG. 3 in that the transistor 37 is initially non-conductive. When the contact 21 first engages the contacts 31 and 32, the ratio of the resistance of the contact 21 to the resistor 34 is such that the voltage at the output terminal 38 is relatively low. As pressure on the contact 21 is increased, the voltage at the output terminal 38 increases due to reduction in the resistance of the contact 21. At the threshold level of the switching circuit 44, the switching circuit suddenly applies a voltage to the base of the transistor 37 that causes the latter to become conductive and effectively connect the resistor 36 in parallel with the resistance of the contact 21, thereby sharply raising the voltage at the terminal 38 and driving the switching circuit 44 well into its operative region and beyond the threshold level. Conversely, as pressure is withdrawn from the contact 21, its resistance increases, causing the voltage at the output terminal 38 to decrease. When this voltage reaches the threshold level of the switching circuit 44, the latter causes the transistor 37 to become non-conductive, which suddenly drops the voltage at the output terminal 38 still further.

Figure 5:
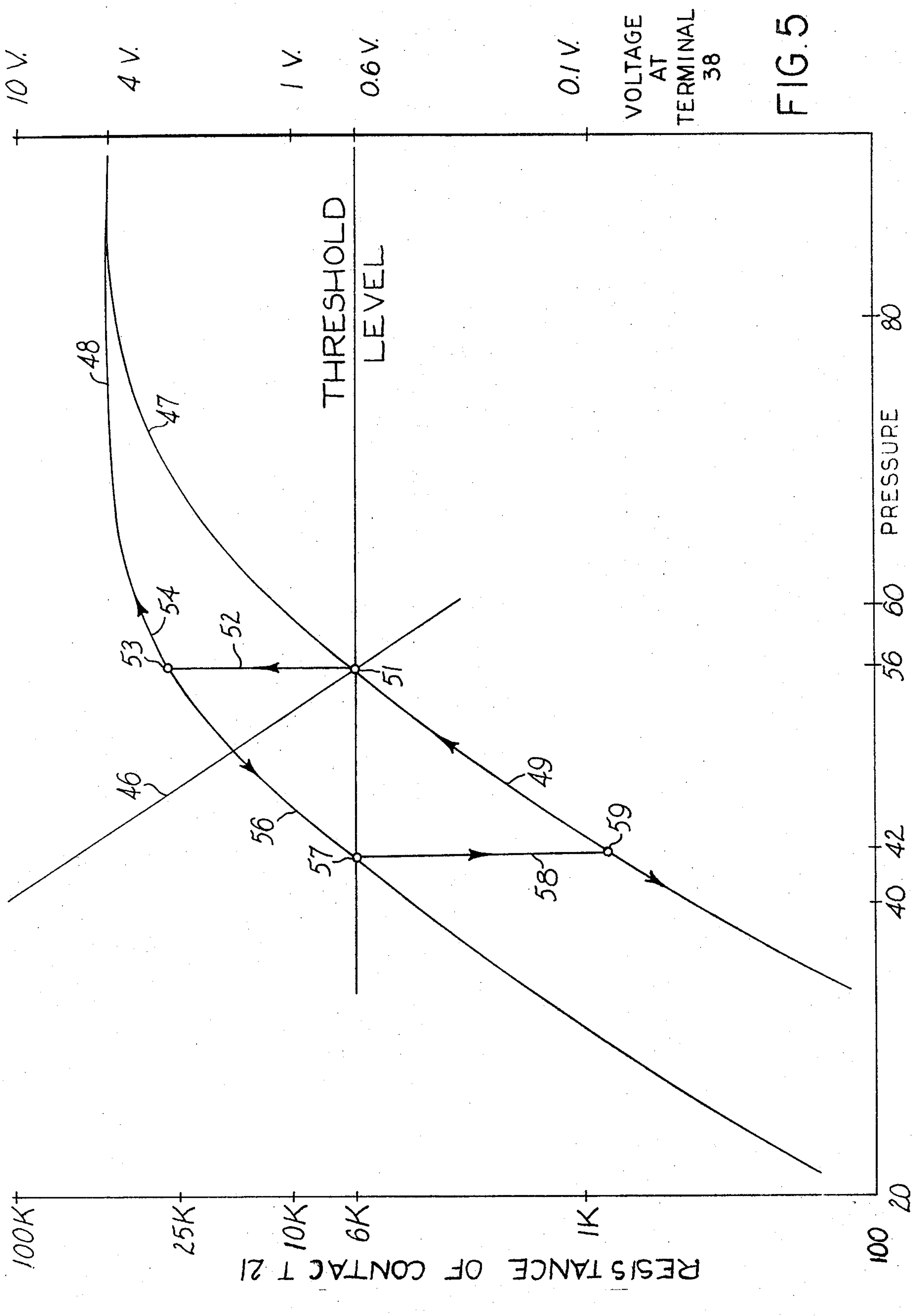
FIG. 5 shows the operating characteristic curve of the data input device of FIG. 3.

FIG. 5 shows a typical graph of operation of the circuit in FIG. 3. The sloping line 46 represents the change of resistance of the contact 21 with respect to change in pressure on the push button 11 in FIG. 1. This change in resistance may be a linear or non-linear function of pressure. The curve 47 represents the change in voltage at the terminal 38 caused by a change in pressure on the push button 11, and therefore on the contact 21, when the resistor 36 is in parallel with the resistor 34 and the combined parallel resistance value of these resistors is approximately 1K. Curve 48 illustrates the change of voltage at the terminal 38 with change in pressure on the push button 11 when the resistor 36 is disconnected from the circuit and the value of resistance of the resistor 34 is approximately 10K.

Initially, as pressure is applied to the push button 11 in FIG. 1, the resistance between the contacts 31 and 32 is infinite, and the voltage at the terminal 38 is below 0.1V and is not in the part of the curve shown in FIG. 5. It is one of the advantages of the present invention that the initial value of resistance between the contacts 31 and 32 when the contact 21 first engages them is not important so long as increasing pressure on the contact 21 reduces the resistance to the range necessary for operation of the circuit.

Increasing pressure on the push button causes the voltage at the terminal 38 to increase along the region 49, and when this voltage reaches the threshold level at the point 51, the voltage actuated circuit 39 produces a voltage that is transmitted through the data circuit 41 and the control circuit 42 to cause the transistor 37 to become non-conductive. As a result, the voltage at the terminal 38 suddenly rises along the path 52 to the point 53 on the curve 48. As may be seen, this voltage is substantially above the threshold level.

Further increased pressure on the push button 11 would increase the voltage at the terminal 38 still more along the section 54 of the curve 48. However, such additional increase of pressure is not necessary once sufficient pressure has been applied to pass the threshold level. As may be seen, in this particular example the threshold level is reached when the pressure is approximately 56 grams.

As pressure is reduced, the voltage at the terminal 38 follows the section of the curve 56 back to its intersection with the threshold level at the point 57. As the voltage passes through the threshold level, the voltage actuated circuit 39 transmits a signal of the proper polarity through the data circuit 41 and the control circuit 32 to make the transistor 37 conductive again. This places the resistor 36 back in parallel with the resistor 34, which changes the transfer characteristic of the circuit back to its original value and sharply drops the voltage at the terminal 38 along the line 58 to the point 59. This occurs when the pressure is reduced to 42 grams. Thus there is a difference of 14 grams between the pressure required to change the state of the data input device back to its original value after it has been changed to its alternative value.

Figure 6:
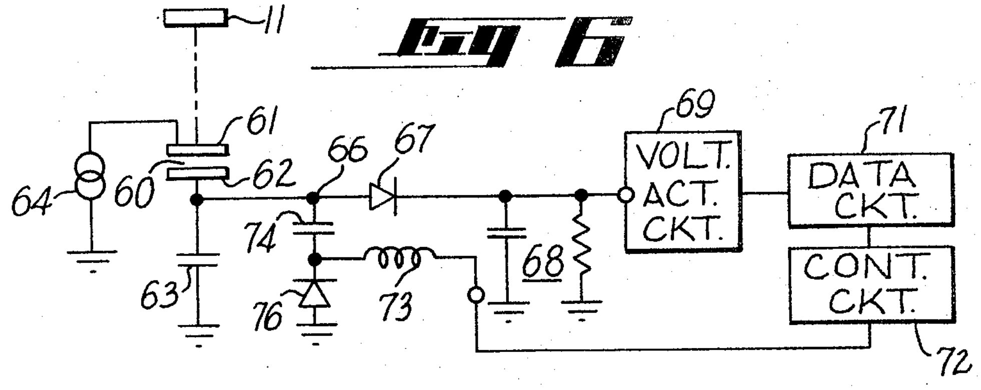
FIG. 6 is a modified circuit of a data input device using variable capacitance.

FIG. 6 shows a modification of the data input device in which variable capacitance is used instead of variable resistance. The push button 11 is connected to one plate 61 of a variable capacitor 60 comprising the plate 61 and another plate 62. This capacitor is connected in series with another capacitor 63 and a source 64 of alternating voltage is connected across this series circuit. An output terminal 66 is at the common junction of the capacitors 60 and 63, and a rectifying circuit comprising a diode 67 and an RC filter 68 is connected to this output terminal. A voltage actuated circuit 69 is connected to the output of the rectifying circuit, and the output of the voltage actuated circuit 69 is connected, in turn, to a data circuit 71. One output of the data circuit 71 is connected to a control circuit 72, the output of which is connected by way of a choke coil 73 to the junction between a capacitor 74 and a varicap 76. The latter is a circuit element that has capacitance that varies with the change in direct voltage across it.

In operation of the circuit in FIG. 6, pressure on the push button 11 moves the plate 61 closer to the plate 62 and increases the capacitance of the capacitor 63. Since the impedance, or more specifically, the reactance, of a capacitor is inversely proportional to the capacitance, the voltage at the terminal 66 increases as the plates 61 and 62 get closer together. This voltage is rectified by the diode 67 and smoothed by the filter 68 to produce a suitable direct voltage to be applied to the input circuit of the voltage actuated circuit 69. When the voltage across the filter 68 reaches the threshold level of the voltage actuated circuit 69, a signal is produced as in the circuit of FIG. 3 and is fed back by way of the choke 73 to the varicap 76. The purpose of the choke 73 is to prevent alternating currents from reaching the control circuit 72 but to allow direct voltage to be applied from the control circuit to the varicap. The variation of the direct voltage applied to the varicap 76 is such as to increase the impedance of the series circuit comprising the capacitor 74 and the varicap 76 and thus increase the impedance of that part of the voltage divider circuit below the capacitor 60. This increase in the impedance of that part of the circuit is the same type of change of transfer characteristic of the coupling circuit as was discussed in connection with FIG. 3, and it causes a further increase in the voltage applied to the voltage actuated circuit 69.

Conversely, movement of the plate 61 away from the plate 62 decreases the voltage at the terminal 66. When the latter voltage reaches a level such that the direct component applied to the voltage actuated circuit 69 passes through the critical level, the circuit 69 will apply a voltage to the data circuit 71 and the control circuit 72 of the proper polarity to change the capacitance of the varicap 76 in the reverse manner and reduce the voltage at the output terminal 66 even more. As a result the operation of the circuit in FIG. 6 is basically the same as that in FIG. 3.

Figure 7:
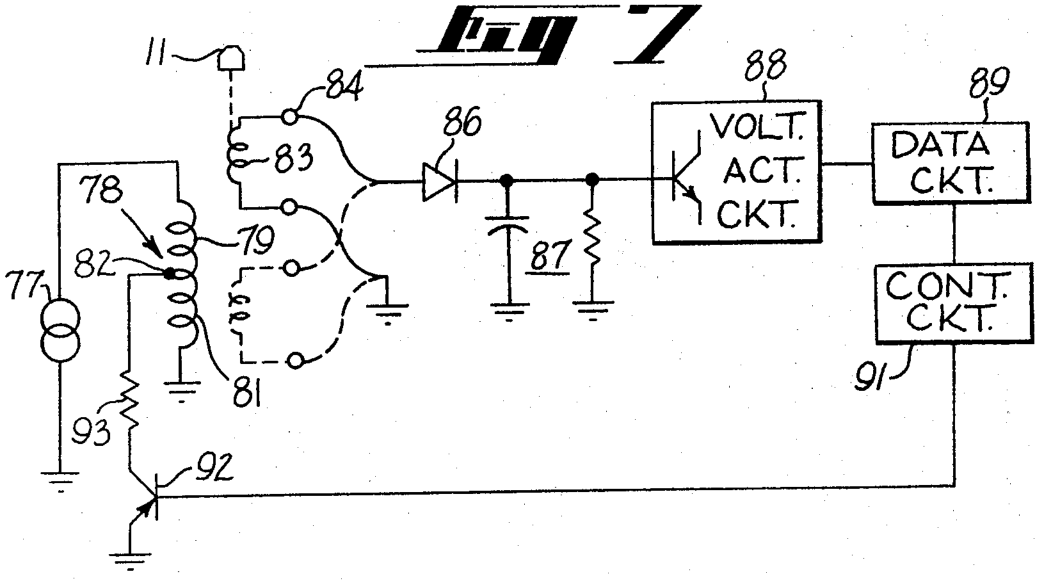
FIG. 7 is another embodiment of a data input device utilizing variable inductance.

FIG. 7 shows another form of circuit using a variation of inductance as the means fro achieving hysteresis operation. in FIG. 7 a source 77 of alternating voltage is connected across a primary winding 78 that comprises two sections 79 and 81 joined together at a tap 82. A secondary winding 83 is connected to a push button 11 to be moved relativ to the primary 78 to change the coupling between the primary and secondary. Alternative means may be used to change the coupling between the primary and secondary.

One end of the secondary 83 is connected to ground and the other end, which is designated at the output terminal 84, is connected to a rectifying circuit comprising a diode 86 and a filter circuit 87. The output of the rectifying circuit is connected to the input circuit of a voltage actuated circuit 88, the output of which is connected to a data circuit 89. An output of the data circuit 89 is connected to a control circuit 91, and this, in turn, is connected to the base of a transistor 92. A current limiting resistor 93 is connected in series with the emitter-collector circuit of the transistor 92 between the tap 82 and ground.

In the operation of the circuit in FIG. 7, movement of the secondary 83 changes the coupling between the primary 78 and the secondary. When the secondary reaches the position shown in dotted lines, the coupling is sufficiently great to make the output voltage applied to the diode 86 high enough to reach the threshold level of the voltage actuated circuit 88 and produce a feedback signal to cause the transistor 92 to be conductive. The transistor 92 changes the effective number of turns in the primary 78 and thereby causes an increase in the voltage across the secondary 83. This increase in voltage, when rectified, drives the input voltage to the circuit 88 above the threshold level and produces the same effect as described in connection with FIG. 3. Removal of pressure from the push button 11 causes the secondary 83 to move away from the primary 78 and reduces the coupling therebetween, thereby reducing the voltage applied to the circuit 88. As a result the state of conductivity of the transistor 92 is reversed and the transfer characteristic circuit connecting the source 77 to the voltage actuated circuit 88 is changed in the proper manner to reduce the input voltage to the circuit 88 even farther below the threshold level.

FIG. 9 shows the essential components of a calculator using input circuits of the type shown in FIG. 3. In order to avoid unnecessary repetition FIG. 9 shows only some of the circuits, but it is to be understood that these could be repeated to provide means for entering all 10 numbers from 0 to 9 into the calculating portion of the circuit.

The first input circuit comprises the switch 10 connected in series with the resistor 34 across a voltage source indicated by the terminal 33 and ground. As in FIG. 3, the resistor 36 connected in series with the emitter-collector circuit of the transistor 37 forms a parallel circuit with the resistor 34, and the output terminal of this portion of the whole circuit is indicated by reference numeral 38 which is connected to the base of a transistor 94. This transistor acts as the voltage actuated circuit and is connected to an inverter 96 and to one of the input circuits of an AND gate 97. The output circuit of the inverter 96 is connected to one of the input circuits of another AND gate 98 and to one of the input circuits of an OR gate 99. The output of the AND gate 98 is connected to an encoder 101 which, in turn, is connected by way of a buffer stage 102 to a data processing circuit 103.

The output of the AND circuit 97 is connected to one input of an AND circuit 104, and a "system ready" signal is connected from a terminal 105 of the data processing circuit 103 to another input circuit of the AND gate 104. The output of the AND gate 104 is connected to the reset input terminal R of a flip-flop circuit 106. The output of the OR gate 99 is connected to the set terminal S of the flip-flop circuit 106. The output of the flip-flop circuit 106 is connected through an inverter 107 and the resistor 43 back to the base of the transistor 37.

The other input circuits between the voltage source terminal 33 and the encoder 101 similar to the one just described, are identified by similar reference numerals with the subscripts *a* and *b*. It will be noted that the lower end of each of the resistors 34 and the emitter of each of the transistors 37 is directly connected to ground so that these input circuits are entirely separate from one another. Similarly, the emitters of the transistors 94 are connected directly to ground. This makes each of the input circuits independent in its operation, except that a signal from the inverter 107 that causes the transistor 10 to change from being conductive to non-conductive, or vice versa, will affect the transistors **37*a* and 37*b*** in the same way.

At the beginning of operation of the circuit 9 the transistors **94–94*b* are all non-conductive. In logic terms, this is equivalent to saying that their collectors are at the 1 level. Since this is true of all of the input circuits to the AND gate 97, its output terminal is also at the 1 level, as indicated at the left-hand end of the waveform shown in FIG. 8A. The output of the inverters 96–96*b* are in the opposite state, or at the 0 level, and therefore the output of the OR gate 99 is at the 0 level, as indicated by the left-hand end of the waveform shown in FIG. 8D. The "system ready" signal at the output terminal 105 is initially also at the 1 level, as indicated by the left-hand end of the waveform shown in FIG. 8B. Both inputs to the AND gate 104 are thus initially at the 1 level and so the output of this AND gate is at the 1 level, as indicated by the left-hand end of the waveform in FIG. 8C. The flip-flop circuit 106 is so arranged that its output terminal connected to the inverter 107 is initially at the 0 level, as indicated by the left-hand end of the waveform in FIG. 8E. This is inverted in the inverter 107 so that the output of the latter is at the 1 level, which makes all of the transistors 37–37*b* conductive. The output of the inverter 107 is also connected back to a second input circuit of each of the AND gates 98–98*b*, but the signal applied to the other input circuit of each of these AND gates is at the 0 level from the inverters 96–96*b*.**

When one of the switching devices, for example the switching device 10, is actuated, the voltage at the terminal 38 increases to the point that the transistor 94 becomes conductive. This causes its collector to drop to the 0 level, which in turn, causes the output of the AND gate 97 to drop to the 0 level, at the time $t_1$ as indicated in FIG. 8A.

The 0 level signal is inverted by the inverter 96 and is applied to the AND gate 98 as a 1 level signal. Since the other signal applied to the AND gate 98 is also a 1 level signal, a 1 level signal is applied by this AND gate to the encoder 101 to produce a suitably encoded signal indicating that that particular switching device 10 has been actuated. This signal passes through the buffer 102 and is utilized in the data processing circuit 103. Shortly after the switching device 10 is actuated, the data processing circuit 103 begins to utilize the information received from the encoder 101. During the time that the data processing circuit is doing so, no other data should be entered, and in order to keep this from happening, the voltage at the output terminal 105 drops to the 0 level as indicated in FIG. 8B. Under normal circumstances the data processing takes only a small amount of time as indicated by the fact that the voltage at the terminal 105 remains at the 0 level for a short interval and then returns to the 1 level, indicating that the data processing circuit is ready to receive new data.

Figures 8A, 8B, 8C, 8D, 8E:
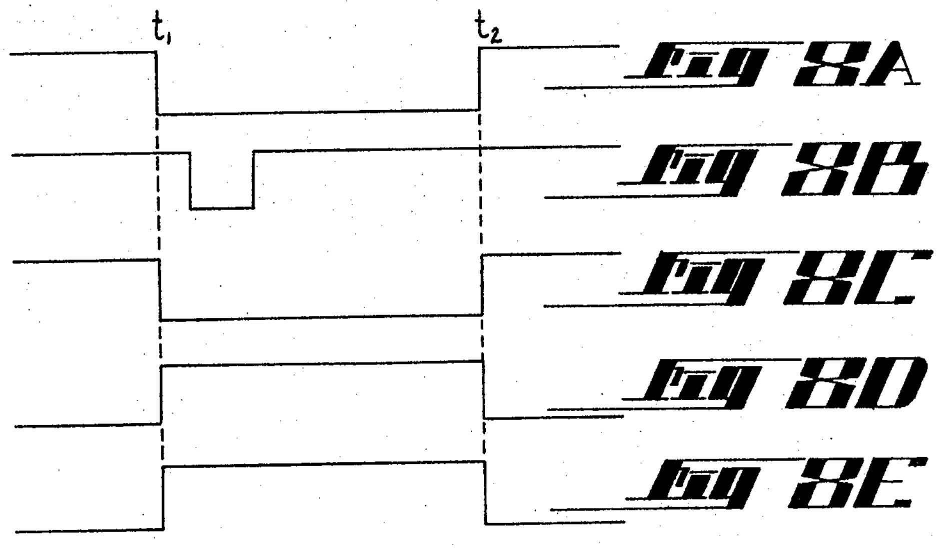
FIGS. 8A–8E are switching voltage waveforms that occur in the operation of the data input device of the present invention.
Figure 5:
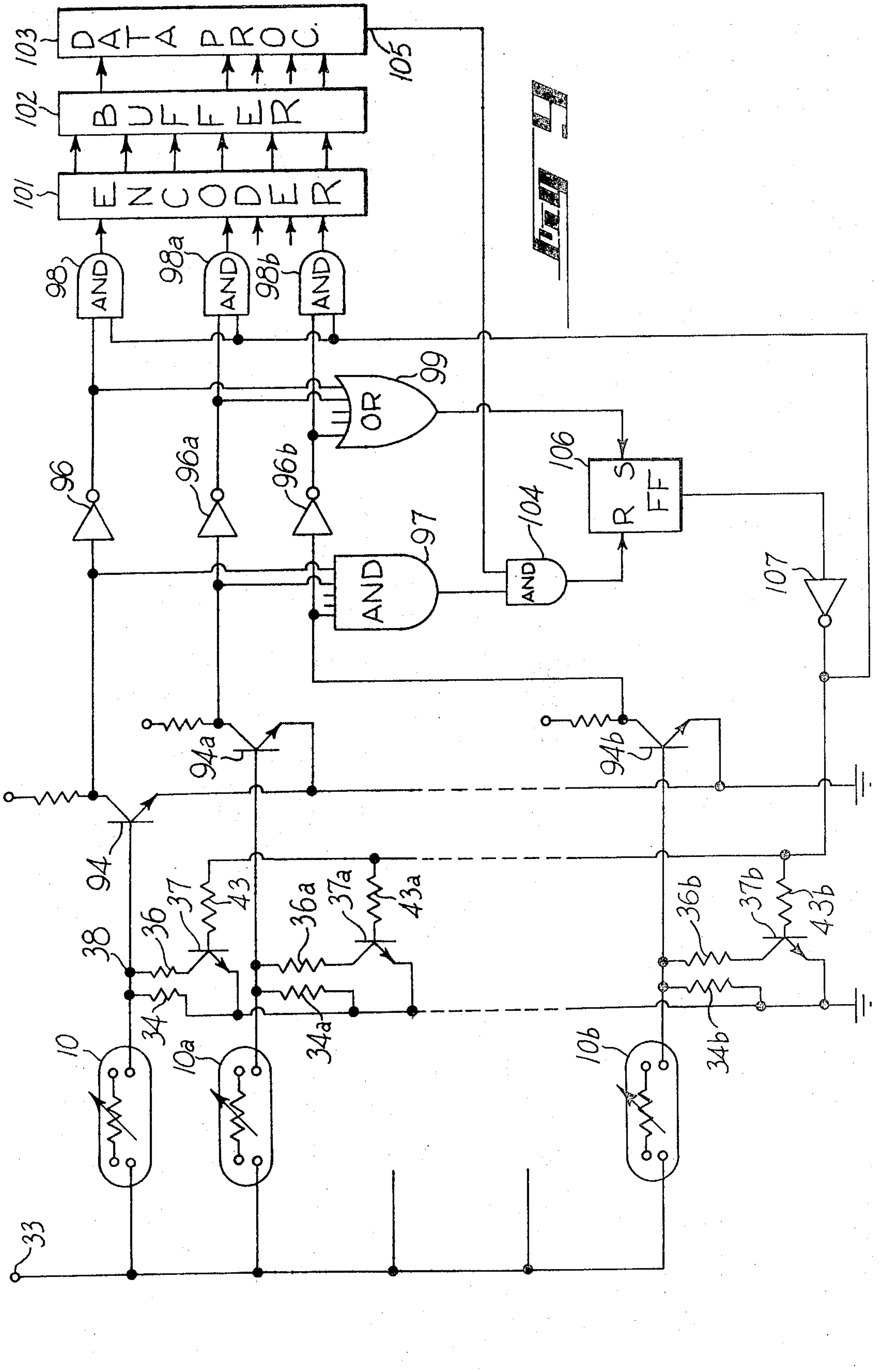

When the output of the AND gate 97 drops to the 0 level, the output of the AND gate 104 is also forced to drop to the 0 level, as shown in FIG. 8C. At the same time, the output of the OR gate 99 rises to the 1 level as indicated by the waveform in FIG. 8D. This causes the conductivity of the flip-flop 106 to change states so that the output rises to the 1 level as indicated by the waveform in FIG. 8E. This forces the output of the inverter 107 to drop to the 0 level and makes all of the transistors **37–37*b* non-conductive. At the same time the output of the inverter 107 applies the same 0 level to all of the AND gates 98–98*b* and prevents any of them from feeding further information to the encoder 101.**

At the time $t_2$, pressure is released from the switching device 10 sufficiently to allow the voltage at the terminal 38 to drop below the threshold level of the transistor 94. The output at the collector of this transistor then rises again to the 1 level, and the output of the AND gate 97 rises to the 1 level as indicated in FIG. 8A. Since the "system ready" signal has already been received from the terminal 105 of the data processing circuit 103, the output of the AND gate 104 also rises to the 1 level at the time $t_2$, as indicated in FIG. 8C. The OR gate 99 now has only 0 level signals applied to it and so its output also drops to the 0 level. This sets the flip-flop 106 so that its output returns to the 0 level, as indicated in FIG. 8E and causes the output of the inverter 107 to return to the 1 level, which makes all the transistors **37–37*b* conductive again. At this time the circuit is ready for entry of new data by actuation of any of the switching devices 10–10*b*.**

Figure 10:
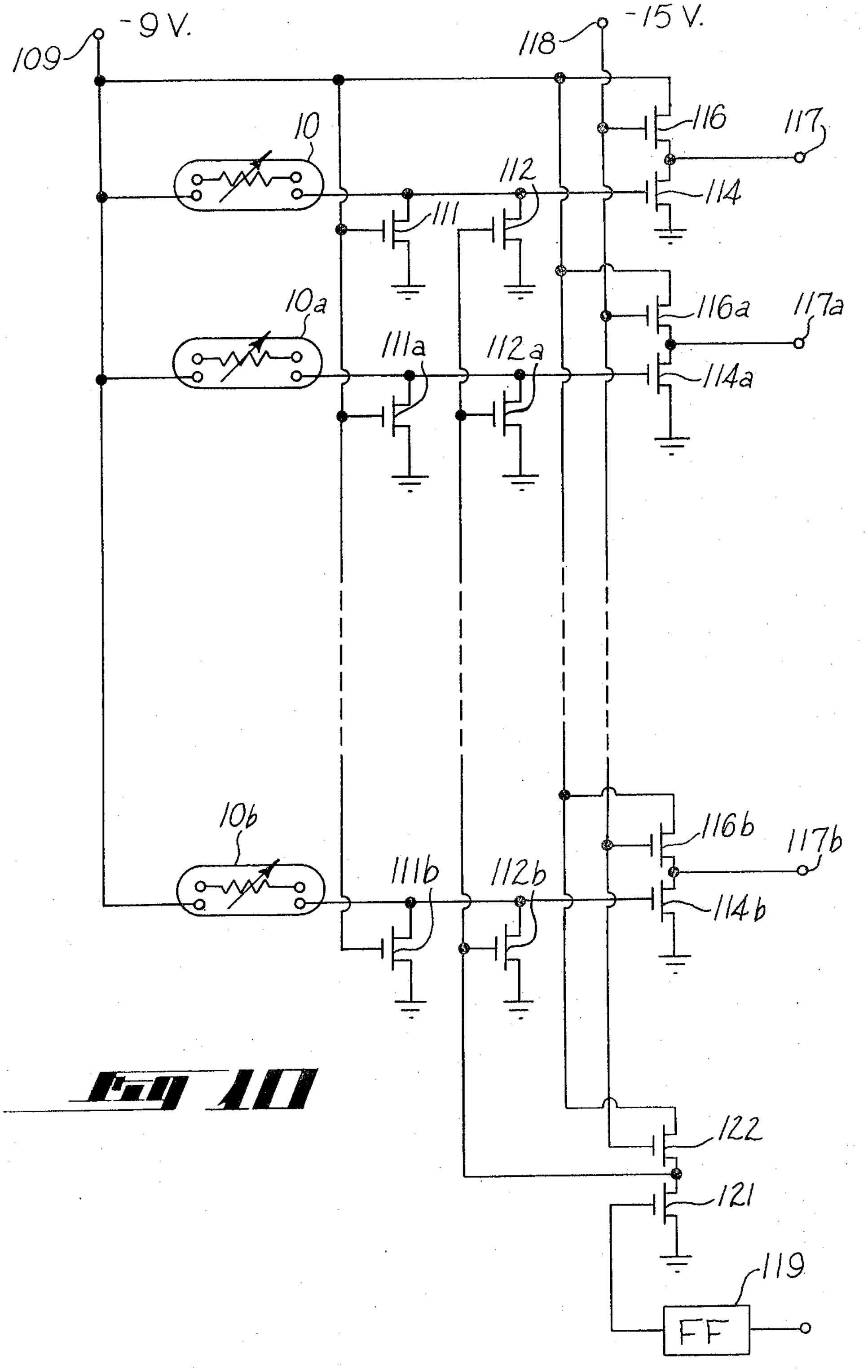
FIG. 10 is a modified form of the input section of the data handling device of FIG. 9.

FIG. 10 shows a modified embodiment of the input section of the circuit in FIG. 9 utilizing MOS transistors instead of resistors or reactive devices in the coupling circuit. The embodiment in FIG. 10 is therefore suited for production by integrated circuit techniques. As in the case in FIG. 9 the input circuits shown in FIG. 10 include three identical sections and corresponding components are identified by the same reference numerals but with the addition of letter suffixes. Therefore only one of the three input circuits in FIG. 10 need be described in detail.

The circuit in FIG. 10 includes a switch 10 of the same type as the circuit in FIG. 9. One terminal of this switch is connected to the negative terminal 109 of a 9V. power supply. The positive terminal of this supply is connected to ground. The other terminal of the switch 10 is connected to ground through the current-carrying source-drain circuit of a MOS transistor 111. The gate of this transistor is connected to the power supply terminal 109 to maintain the source-drain circuit at a constant impedance level of any suitable value, for example, 100K. The source-drain circuit of a second MOS transistor 112 is connected directly in parallel with that of the transistor 111, and the common junction of the switch 10 and the transistors 111 and 112 constitutes the output terminal 113 of this coupling circuit.

The terminal 113 is connected to the gate electrode of another MOS transistor 114. Instead of a load resistor, the source-drain circuit of the transistor 114 is connected in series with the source-drain circuit of still another MOS transistor 116, and these two transistors are connected between the terminal 109 and ground. An output terminal 117 is connected to the common point between the transistors 114 and 116, and the gate of the transistor 116 is connected to a terminal 118 of a power supply of about 15V.

The transfer characteristic of the circuit that couples the terminal 109 to the gate of the transistor 114 is controlled by the output of a logic circuit similar to the logic components shown in FIG. 9. These components control a flip-flop 119 which corresponds to the flip-flop 106 in FIG. 9, except that the polarity of its output signal is inverted because the conductivity of the MOS transistors in FIG. 10 is opposite to the conductivity of the transistors shown in FIG. 9. The output of the flip-flop 119 is connected to the gate of a MOS transistor 121 which has its source-drain circuit in series with the source-drain circuit of another MOS transistor 122. This series circuit is connected between the terminal 109 and ground, and the gate of the transistor 122 is connected to the terminal 118 to be biased to the conductive state. The common point between the transistors 121 and 122 is connected to the gates of all three of the transistors **112–112*b*.**

When one of the switches, for example, the switch 10 is depressed to initiate operation of the circuit in FIG. 10, current starts to flow through this switch and through the parallel circuit comprising the transistors 111 and 112. As the pressure on the switch 10 is increased, the magnitude of the voltage at the terminal 113 increases, that is, the voltage of the terminal 113 approaches closer to −9V. At the threshold level of the transistor 114, that transistor is made conductive so that the voltage at its output terminal rises from the 0 level to the 1 level, which means from a negative voltage to approximately ground voltage.

The operation of the logic circuits, which are not shown in FIG. 10, causes the flip-flop 119 to reverse its state of conductivity. This means that the voltage at the output terminal must change from the 1 level to the 0 level, thereby making the transistor 121 conductive and pulling the voltage level of the gates of the transistors **112–112*b* toward ground voltage from their previous negative potential. Thus, the change of voltage at the output of the flip-flop 119 is inverted by the transistor 121, which corresponds to the inverter 107 in FIG. 9.**

When the voltage at the gates of the transistors **112–112*b* rises toward ground level, these transistors become non-conductive, thereby changing the transfer characteristic of this portion of the circuit. As in the previous embodiments, this change causes the voltage at the output terminal 113 to change rather sharply in the same direction as it was changing prior to reaching the threshold level of the transistor 114. This additional change carries the voltage at the terminal 113** well past the threshold level.

As a consequence of the change in transfer characteristic of the input circuit by making the transistor 112 non-conductive, a considerable amount of pressure must be removed from the switch 10 and its resistance changed considerably before the voltage at the terminal 113 drops back to the threshold level of the transistor 114. However, as the magnitude of this voltage does drop through the threshold level, the transistor 114 becomes non-conductive and operates the logic circuits in the opposite sense from the previous operation. It should be kept in mind that, when the magnitude of the voltage applied to the gate of the transistor 114 drops, the voltage itself is becoming less negative and is approaching ground potential.

The reversal of operation when the transistor 114 passes back through its threshold level causes reversal of the state of conductivity of the flip-flop circuit 119, which, in turn, causes the transistor 121 to become non-conductive. When the transistor 121 becomes non-conductive, it causes the voltage level at the gates of the transistors **112–112*b* to become more negative and turns these transistors back on. This completes the reversal of the circuit back to its original transfer characteristic and causes a further reduction in the magnitude of the voltage applied to the gate of the transistor 114, which drives the transistor 114** farther from the cut-off level.

The foregoing embodiments have illustrated examples of various types of impedances used in a circuit in conjunction with a switch incorporating its own variable impedance to achieve hysteresis of operation. There are, of course, many possible variations of the actual circuits within the scope of this invention.

What is claimed is:

1. A data input device comprising:

A. a voltage source;

B. a switching circuit comprising input and output circuits; and

C. coupling circuit means comprising:

1. an actuator responsive to pressure;
2. mechanically variable impedance means connected to said actuator to be varied by pressure thereon,
3. additional impedance means defining, with said variable impedance means, first and second transfer characteristics, said coupling circuit means being connected to said source to derive voltage therefrom and being connected to said input circuit of said switching circuit to transfer actuating voltage from said source to said switching circuit, said output circuit of said switching circuit being connected to said coupling circuit to shift from said first to said second transfer characteristic as said actuating voltage reaches the threshold level of said switching circuit to change said actuating voltage in the same direction and beyond said threshold level.

2. The data input device of claim 1 in which said mechanically variable impedance means comprises a variable resistor.

3. The data input device of claim 1 in which said mechanically variable impedance means comprises a variable capacitor.

4. The data input device of claim 1 in which said mechanically variable impedance means comprises a variable inductor.

5. The data input device of claim 1 in which said additional impedance means comprises a parallel circuit connected in series with said mechanically variable impedance means and comprising:

A. a first branch comprising a first impedance; and

B. a second branch connected in parallel with said first branch and comprising a second impedance and means to control the effective magnitude of said second impedance.

6. The data input device of claim 5 in which said second impedance is the source-drain impedance of a MOS transistor and said means to control the effective magnitude of said second impedance comprises the gate of said transistor.

7. The data input device of claim 5 in which both said first and second impedances are resistors and said means to control the effective magnitude of said second impedance comprises a switching transistor connected in series with said second impedance.

8. The data input device of claim 5 in which said first and second impedances comprise first and second capacitors, said means to control the effective magnitude of said second impedance comprises a varicap connected in series with said second capacitor, and said mechanically variable impedance means comprises a variable capacitor.

9. The data input device of claim 1 in which said coupling circuit means comprises a switch comprising:

A. said actuator movable in response to pressure;

B. first and second relatively fixed contacts; and

C. a movable contact operated by said actuator and movable into engagement with said first and second contacts, said movable contact comprising said variable impedance in the form of a variable resistor responsive to pressure of said actuator to vary the resistance between said first and second contacts.

10. The data input device in claim 1 in which said mechanically variable impedance means and said additional impedance means are connected in series as a voltage divider across said voltage source, and said input circuit of said switching circuit is connected to said additional impedance means, whereby said actuating voltage is a voltage-divided fraction of the voltage of said source.

11. The data input device of claim 10 in which said additional impedance means comprises means controlled by said switching circuit to shift the magnitude of impedance of said additional impedance means from a relatively lower value to a higher value that corresponds to said second transfer characteristic to transfer a higher voltage-divided fraction of said source voltage to said voltage actuated circuit when said actuating voltage increases to said threshold level from a lower level, and to shift the magnitude of impedance of said additional impedance means from said higher value to said lower value that corresponds to said first transfer characteristic to transfer a lower voltage-divided fraction of said source voltage to said voltage actuated circuit when said actuating voltage decreases to said threshold level from a higher level.

* * * * *